United States Patent
Yong et al.

(10) Patent No.: US 11,468,599 B1
(45) Date of Patent: Oct. 11, 2022

(54) MONOCULAR VISUAL SIMULTANEOUS LOCALIZATION AND MAPPING DATA PROCESSING METHOD APPARATUS, TERMINAL, AND READABLE STORAGE MEDIUM

(71) Applicant: Shenzhen Reolink Technology Co., Ltd., Shenzhen (CN)

(72) Inventors: Sheng Yong, Shenzhen (CN); Xiaoyu Liu, Shenzhen (CN); Rui Zhou, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/553,715

(22) Filed: Dec. 16, 2021

(30) Foreign Application Priority Data

Jun. 17, 2021 (CN) .......................... 202110670789.1

(51) Int. Cl.
*G06T 7/73* (2017.01)
*G06T 3/60* (2006.01)
(Continued)

(52) U.S. Cl.
CPC .................. *G06T 7/80* (2017.01); *G06T 3/60* (2013.01); *G06T 7/579* (2017.01); *G06T 7/73* (2017.01);
(Continued)

(58) Field of Classification Search
None
See application file for complete search history.

(56) References Cited

U.S. PATENT DOCUMENTS 8,594,370 B2 * 11/2013 Schamp ................. G06V 20/58
382/104
8,676,498 B2 * 3/2014 Ma .......................... G05D 1/027
353/30
(Continued)

FOREIGN PATENT DOCUMENTS

CN 108648215 A * 10/2018 ............. G06T 7/246
CN 110084832 A * 8/2019 ............. G01C 21/16

OTHER PUBLICATIONS

Espacenet English translation of CN 108648215A (Year: 2022).*
Espacenet English translation of CN 110084832A (Year: 2022).*

*Primary Examiner* — Tyler W. Sullivan
(74) *Attorney, Agent, or Firm* — Idea Intellectual Limited; Margaret A. Burke; Sam T. Yip

(57) ABSTRACT

A monocular visual simultaneous localization and mapping (SLAM) data processing method. The SLAM data processing method comprises: obtaining rotation angular velocities and accelerations of a camera cyclically; obtaining a plurality of feature point pairs in two frames of images acquired by the camera, and obtaining pixel coordinate values of feature points in the feature point pairs, where each of the feature point pairs includes two feature points that correspond to a same feature of a same object and that are respectively in the two frames of images; obtaining to-be-selected rotation matrices and to-be-selected displacement matrices according to the pixel coordinate values; obtaining a reference rotation matrix of the camera according to the rotation angular velocities, and obtaining a reference displacement matrix of the camera according to the accelerations; and filtering the to-be-selected rotation matrices and the to-be-selected displacement matrices according to the reference rotation matrix and the reference displacement matrix.

3 Claims, 7 Drawing Sheets

| $\theta_{R2}$ \ $\theta_{R1}$ | Greater than 90° | Less than 90° | Equal to 90° |
|---|---|---|---|
| Greater than 90° | Unsuccessful | Retain $\lambda_{Rs1}$ | Unsuccessful |
| Less than 90° | Retain $\lambda_{Rs2}$ | Unsuccessful | Unsuccessful |
| Equal to 90° | Unsuccessful | Unsuccessful | Unsuccessful |

(51) Int. Cl.
*G06V 10/24* (2022.01)
*G06T 7/579* (2017.01)
*G06V 30/146* (2022.01)
*G06T 7/80* (2017.01)
*G06T 7/00* (2017.01)

(52) U.S. Cl.
CPC .............. *G06T 7/97* (2017.01); *G06V 10/242* (2022.01); *G06V 10/245* (2022.01); *G06V 30/1463* (2022.01); *G06T 2207/10016* (2013.01)

(56) References Cited

U.S. PATENT DOCUMENTS

| | | | |
|---|---|---|---|
| 9,251,590 B2* | 2/2016 | Sharp | G06T 7/74 |
| 10,162,362 B2* | 12/2018 | Tsai | G06V 20/20 |
| 11,181,379 B2* | 11/2021 | Babu | G01C 21/165 |
| 2020/0218929 A1* | 7/2020 | Li | G06V 10/462 |
| 2022/0070433 A1* | 3/2022 | Lee | H04N 13/221 |
| 2022/0147053 A1* | 5/2022 | Lin | G01S 17/89 |

\* cited by examiner

| $\theta_{R2}$ \ $\theta_{R1}$ | Greater than 90° | Less than 90° | Equal to 90° |
|---|---|---|---|
| Greater than 90° | Unsuccessful | Retain $\lambda_{Rs1}$ | Unsuccessful |
| Less than 90° | Retain $\lambda_{Rs2}$ | Unsuccessful | Unsuccessful |
| Equal to 90° | Unsuccessful | Unsuccessful | Unsuccessful |

MONOCULAR VISUAL SIMULTANEOUS LOCALIZATION AND MAPPING DATA PROCESSING METHOD APPARATUS, TERMINAL, AND READABLE STORAGE MEDIUM

CROSS-REFERENCE TO RELATED APPLICATIONS

The present application claims priority from the Chinese Invention Patent Application No. 202110670789.1 filed Jun. 17, 2021, and the disclosure of which is incorporated herein by reference in its entirety.

FIELD OF THE INVENTION

This application relates to the field of electronic technologies, and more specifically, to a monocular visual simultaneous localization and mapping (SLAM) data processing method, apparatus, terminal, and non-transitory computer-readable storage medium for implementing the same.

BACKGROUND OF THE INVENTION

In recent years, the simultaneous localization and mapping (SLAM) technology has been playing an important role in localization in an unknown environment, and particularly in a scenario in which technologies such as GPS dependent on the external environment to provide localization assistance cannot be used. At present, in monocular SLAM, the positions and postures of acquisition visions are generally deduced according to changes in feature points in two photos of a same object obtained under different acquisition visions. However, during the selection of the feature points in the two photos to obtain the positions and postures of the acquisition visions, there are usually problems such as mismatches, incomplete matching, and invalid matching in the process of feature point matching. As a result, the obtained positions and postures of the acquisition visions are inaccurate, thereby affecting the accuracy of localization.

SUMMARY OF THE INVENTION

Implementations of this application provide a monocular visual simultaneous localization and mapping (SLAM) data processing method, apparatus, terminal, and non-transitory computer-readable storage medium for implementing the same.

The data processing method provided in the implementations of this application includes: obtaining rotation angular velocities and accelerations of a camera cyclically; obtaining a plurality of feature point pairs in two frames of images acquired by the camera, and obtaining pixel coordinate values of feature points in the feature point pairs, where each of the feature point pairs includes two feature points that correspond to a same feature of a same object and that are respectively in the two frames of images; constructing epipolar constrict equations and calculating to-be-selected rotation matrices and to-be-selected displacement matrices according to pixel coordinate values and the epipolar constraint equations; obtaining a reference rotation matrix of the camera according to the rotation angular velocities of the camera, and obtaining a reference displacement matrix of the camera according to the accelerations of the camera; and filtering the to-be-selected rotation matrices and the to-be-selected displacement matrices according to the reference rotation matrix of the camera and the reference displacement matrix of the camera.

The data processing apparatus provided in the implementations of this application includes an obtaining module and a filtering module. The obtaining module is configured to: obtain rotation angular velocities and accelerations of a camera cyclically; obtain a plurality of feature point pairs in two frames of images acquired by the camera, and obtain pixel coordinate values of feature points, where each of the feature point pairs includes two feature points that correspond to a same feature of a same object and that are in the two frames of images acquired by the camera; obtain to-be-selected rotation matrices and to-be-selected displacement matrices according to the pixel coordinate values; and obtain a reference rotation matrix of the camera according to the rotation angular velocities of the camera, and obtain a reference displacement matrix of the camera according to the accelerations of the camera. The filtering module is configured to filter the to-be-selected rotation matrices and the to-be-selected displacement matrices according to the reference rotation matrix of the camera and the reference displacement matrix of the camera.

The terminal provided in the implementations of this application includes a camera, one or more processors, a memory, and one or more programs. The camera is configured to acquire an image. The one or more programs are stored in the memory and executed by the one or more processors, where the programs include instructions for performing the data processing method according to any one of the following: obtaining rotation angular velocities and accelerations of a camera cyclically; obtaining a plurality of feature point pairs in two frames of images acquired by the camera, and obtaining pixel coordinate values of feature points in the feature point pairs, where each of the feature point pairs includes two feature points that correspond to a same feature of a same object and that are respectively in the two frames of images; constructing epipolar constrict equations and calculating to-be-selected rotation matrices and to-be-selected displacement matrices according to pixel coordinate values and the epipolar constraint equations; obtaining a reference rotation matrix of the camera according to the rotation angular velocities of the camera, and obtaining a reference displacement matrix of the camera according to the accelerations of the camera; and filtering the to-be-selected rotation matrices and the to-be-selected displacement matrices according to the reference rotation matrix of the camera and the reference displacement matrix of the camera.

The non-transitory computer-readable storage medium provided in the implementations of this application includes a computer program, the computer program, when executed by one or more processors, causing the one or more processors to perform the following data processing method: obtaining rotation angular velocities and accelerations of a camera cyclically; obtaining a plurality of feature point pairs in two frames of images acquired by the camera, and obtaining pixel coordinate values of feature points in the feature point pairs, where each of the feature point pairs includes two feature points that correspond to a same feature of a same object and that are respectively in the two frames of images; constructing epipolar constrict equations and calculating to-be-selected rotation matrices and to-be-selected displacement matrices according to pixel coordinate values and the epipolar constraint equations; obtaining a reference rotation matrix of the camera according to the rotation angular velocities of the camera, and obtaining a reference displacement matrix of the camera according to the accelerations of the camera; and filtering the to-be-selected rotation matrices and the to-be-selected displacement matrices according to the reference rotation matrix of the camera and the reference displacement matrix of the camera.

The data processing method, the data processing apparatus, the terminal, and the non-transitory computer-readable storage medium provided in the implementations of this application can accurately select a combination of to-be-selected rotation matrix and to-be-selected displacement matrix in a monocular visual SLAM method, to ensure that accurate posture and position are obtained by using the monocular visual SLAM method and improve the accuracy of localization. The to-be-selected rotation matrix and the to-be-selected displacement matrix are obtained from a plurality of to-be-selected rotation matrices and a plurality of to-be-selected displacement matrices according to epipolar constraint relationships of the feature point pairs in the two frames of images, and are configured to determine a pose of the camera.

Additional aspects and advantages of the implementations of this application will be partially given in the following descriptions, some of which will become apparent from the following descriptions or may be learned through practices of the implementations of this application.

BRIEF DESCRIPTION OF THE DRAWINGS

The foregoing and/or additional aspects and advantages of this application will become apparent and comprehensible from the descriptions of the implementations below with reference to the accompanying drawings.

DETAILED DESCRIPTION

The following describes the implementations of this application in detail. Examples of the implementations are shown in the accompanying drawings, and same or similar reference signs in all the accompanying drawings indicate same or similar components or components having same or similar functions. The implementations that are described below with reference to the accompanying drawings are exemplary, and are only used to explain the implementations of this application and cannot be construed as a limitation to the implementations of this application.

The visual simultaneous localization and mapping (SLAM) technology is a technology that a terminal (a camera, a robot, a mobile platform, or the like) perceives an environment (captures an images or a video of the environment) during movement to locate the terminal. Particularly, in an unknown environment, or in an environment in which navigation devices such as a GPS cannot be used, the visual SLAM technology can be applied to build a map of the current environment according to environment information acquired by the terminal, and accurately determine the position of the terminal in the current environment (the map of the current environment).

Monocular visual SLAM, or monocular SLAM, is a technology to perform SLAM merely using a single camera (vision sensor). The monocular visual SLAM requires the camera to capture at least two frames of images, and to perform data processing on pixel coordinate values of a plurality of feature points corresponding to a same feature of a same object in the two frames of images to build a map of a current environment and obtain a pose of the camera, thereby locating the position of the camera in the current environment (the map of the current environment) according to the pose of the camera.

Figure 1:
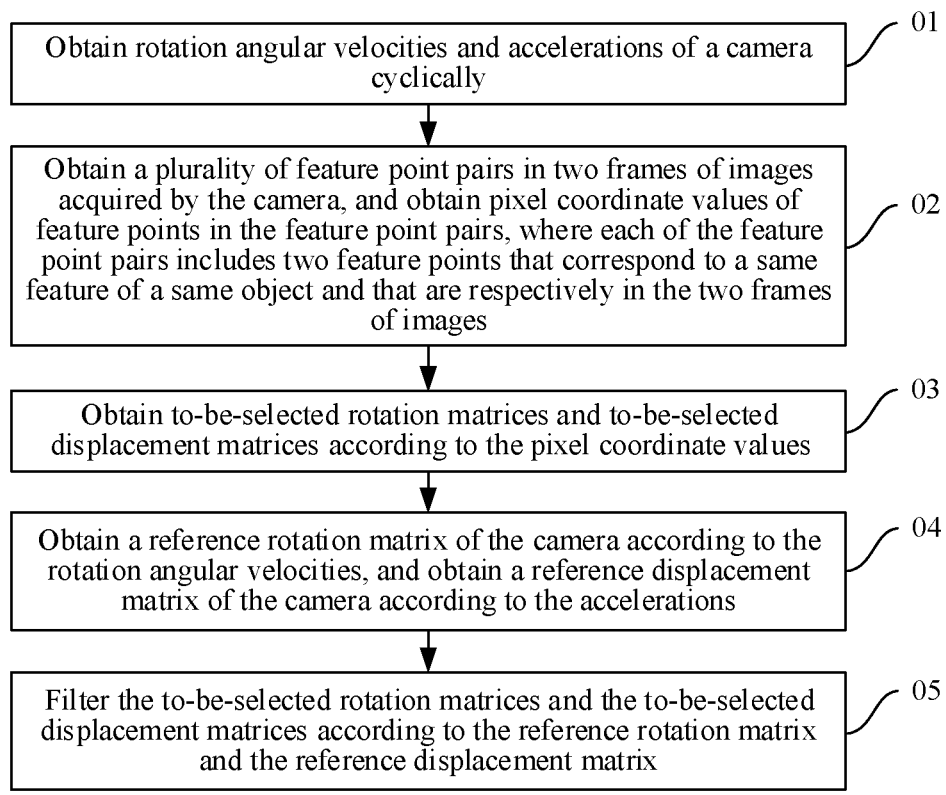
FIG. 1 is a schematic flowchart of a data processing method according to some implementations of this application.
Figure 2:
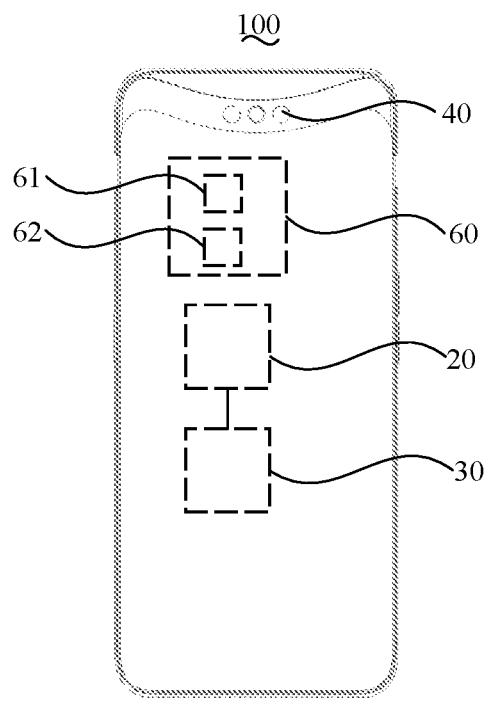
FIG. 2 is a schematic structural diagram of a terminal according to some implementations of this application.
Figure 3:
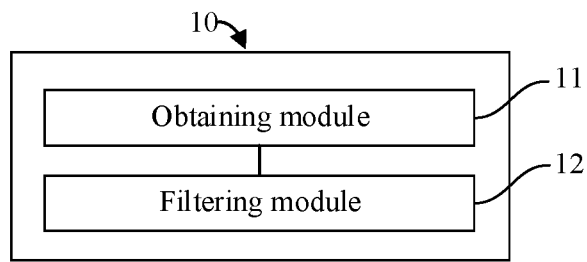
FIG. 3 is a schematic structural diagram of a data processing apparatus according to some implementations of this application.

Referring to FIG. 1 to FIG. 3, the implementations of this application provide a data processing method for monocular visual SLAM. The data processing method includes:

01: Obtaining rotation angular velocities and accelerations of a camera 40 cyclically;

02: Obtaining a plurality of feature point pairs in two frames of images acquired by the camera 40, and obtaining pixel coordinate values of feature points in the feature point pairs, where each of the feature point pairs includes two feature points that correspond to a same feature of a same object and that are respectively in the two frames of images;

03: Obtaining to-be-selected rotation matrices and to-be-selected displacement matrices according to the pixel coordinate values;

04: Obtaining a reference rotation matrix of the camera 40 according to the rotation angular velocities, and obtaining a reference displacement matrix of the camera 40 according to the accelerations; and 05: Filtering the to-be-selected rotation matrices and the to-be-selected displacement matrices according to the reference rotation matrix and the reference displacement matrix.

Referring to FIG. 2, the implementations of this application further provide a terminal 100. The terminal 100 includes a camera 40, one or more processors 30, a memory 20, and one or more programs. The camera 40 is configured to acquire an image. The one or more programs are stored in the memory 20, and executed by the one or more processors 30. The programs include instructions for performing the foregoing data processing methods 01, 02, 03, 04, and 05. The processors 30 may be configured to perform the methods 01, 02, 03, 04, and 05. That is, the processors 30 may be configured to: obtain rotation angular velocities and accelerations of a camera 40 cyclically; obtain a plurality of feature point pairs in two frames of images acquired by the camera 40, and obtain pixel coordinate values of feature points in the feature point pairs, where each of the feature point pairs includes two feature points that correspond to a same feature of a same object and that are respectively in the two frames of images; obtain to-be-selected rotation matrices and to-be-selected displacement matrices according to the pixel coordinate values; obtain a reference rotation matrix of the camera 40 according to the rotation angular velocities, and obtain a reference displacement matrix of the camera 40 according to the accelerations; and filter the to-be-selected rotation matrices and the to-be-selected displacement matrices according to the reference rotation matrix and the reference displacement matrix.

The terminal 100 may be a smartphone, a computer, a mobile platform, a smart watch, a smart bracelet, a smart helmet, or another device, which is not limited herein. The mobile platform may be an unmanned mobile platform such as an unmanned aerial vehicle, an unmanned vehicle, an unmanned ship, and autonomous patrol/surveillance system, or may be a manned mobile platform such as a vehicle, an airplane, or a ship. In one embodiment, the camera 40 may be integrally integrated on the terminal 100. In another embodiment, the camera 40 may be independent from the terminal 100 and detachably mounted on the terminal 100. No limitations are made hereto.

Referring to FIG. 3, the implementations of this application further provide a data processing apparatus 10. The data processing apparatus 10 is applicable to a terminal 100. The data processing apparatus 10 includes an obtaining module 11 and a filtering module 12. The obtaining module 11 may be configured to perform the methods 01, 02, 03, and 04, and the filtering module 12 may be configured to perform the methods 05. That is, the obtaining module 11 may be configured to: obtain rotation angular velocities and accelerations of a camera 40 cyclically; obtain a plurality of feature point pairs in two frames of images acquired by the camera 40, and obtain pixel coordinate values of feature points in the feature point pairs, where each of the feature point pairs includes two feature points that correspond to a same feature of a same object and that are respectively in the two frames of images; obtain to-be-selected rotation matrices and to-be-selected displacement matrices according to the pixel coordinate values; and obtain a reference rotation matrix of the camera 40 according to the rotation angular velocities, and obtain a reference displacement matrix of the camera 40 according to the accelerations. The filtering module 12 may be configured to: filter the to-be-selected rotation matrices and the to-be-selected displacement matrices according to the reference rotation matrix and the reference displacement matrix.

In the data processing method provided in the implementations of this application, data processing is performed on the obtained rotation angular velocities and accelerations of the camera 40, to obtain the reference rotation matrix and the reference displacement matrix of the camera 40. In addition, data processing is performed on the obtained pixel coordinate values of the feature points, to obtain the to-be-selected rotation matrices and the to-be-selected displacement matrices, where there are a plurality of to-be-selected rotation matrices and a plurality of to-be-selected displacement matrices. Furthermore, data processing is performed on the reference rotation matrix, the reference displacement matrix, the to-be-selected rotation matrices, and the to-be-selected displacement matrices, to select one rotation matrix and one displacement matrix from the plurality of to-be-selected rotation matrices and the plurality of to-be-selected displacement matrices. The filtered-out rotation matrix and the filtered-out displacement matrix are used as a pose of the camera 40 at a current position, so as to accurately locate the camera 40.

Figure 4:
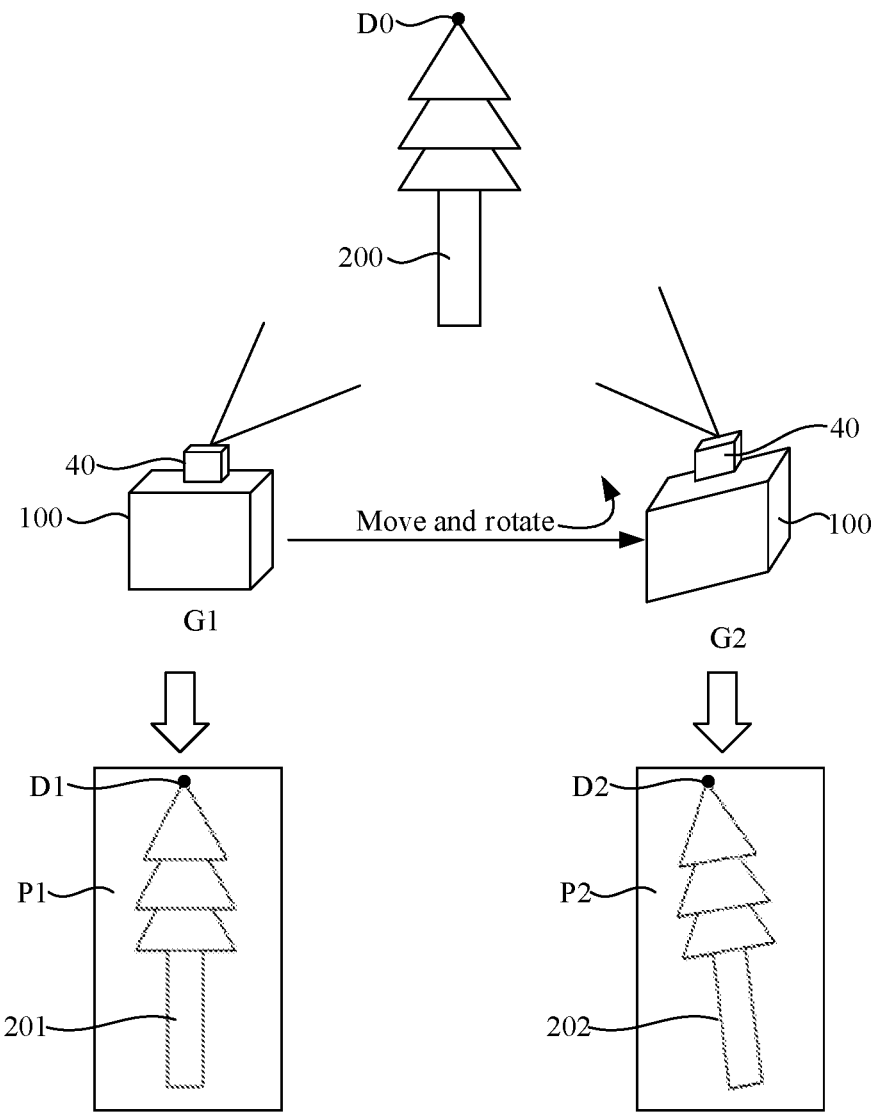
FIG. 4 is a schematic diagram of an application scenario of a data processing method according to some implementations of this application.
Figure 5A:
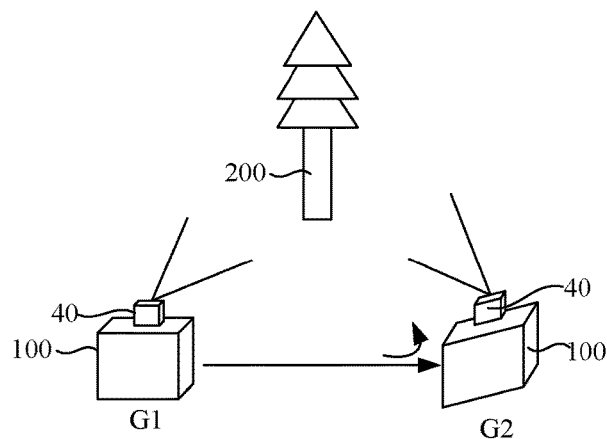
FIGS. 5A through 5D are schematic diagrams of an application scenario of a data processing method according to some implementations of this application.
Figure 5B:
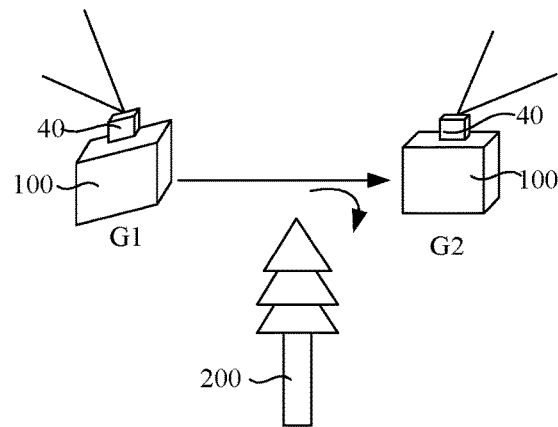
Figure 5C:
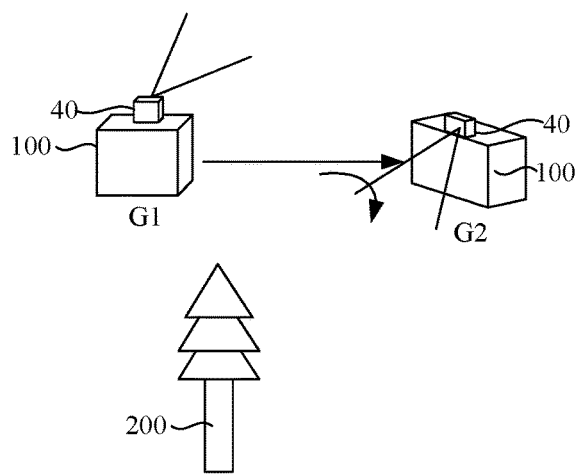
Figure 5D:
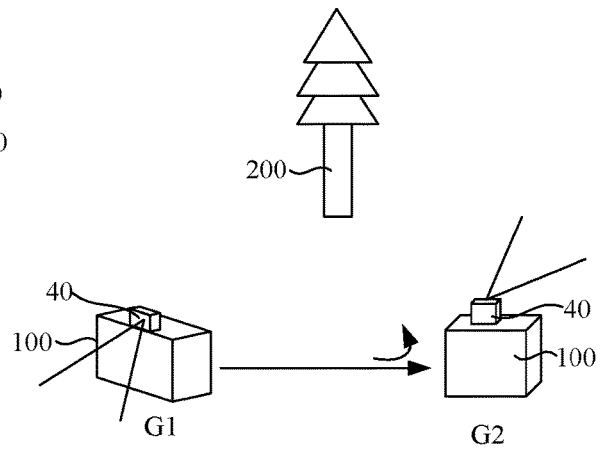

Referring to FIG. 4 and FIGS. 5A-5D, specifically, there is an epipolar constraint relationship between the same feature of the same object and the feature point pair corresponding to the feature in the two frames of images acquired by the camera 40 respectively at a first position G1 and a second position G2. For example, the camera 40 photographs an object 200. In FIG. 4, an object 201 in an image P1 and an object 202 in an image P2 are the same object. A vertex D0 of the object 200 is a feature of the object 200. A point D1 in the image P1 is a feature point corresponding to the feature D0 in the image P1, and a point D2 in the image P2 is a feature point corresponding to the feature D0 in the image P2, where the point D1 and the point D2 are a feature point pair. There is an epipolar constraint relationship between the vertex D0, the point D1, and the point D2, and an epipolar constraint equation can be constructed according to the epipolar constraint relationship: $U^T E V=0$. U is pixel coordinate values of a feature point in a frame of image, $U^T$ is the transposition of U, V is pixel coordinate values of a feature point in another frame of image, and E is an essential matrix. Specifically, $E=W \times R$, where W is a displacement matrix of the camera 40, and R is a rotation matrix of the camera 40. The essential matrix E may be solved according to at least 8 feature point pairs and the epipolar constraint equations by using an eight-point algorithm. Next, singular value decomposition is performed on the essential matrix E to obtain the following relationship: $E=U\Sigma V^T$, where $V^T$ is the transposition of the pixel coordinate values V. Four sets of solutions can be obtained according to $E=U\Sigma V^T$, where each set of solutions includes a displacement matrix W and a rotation matrix R. The displacement matrices W and the rotation matrices R corresponding to the four sets of solutions can numerically reflect pose data of the camera 40. However, only a pose corresponding to the displacement matrix W and the rotation matrix R in one set of solutions among the four sets of solutions can reflect an actual photographing direction of the camera 40 (as shown in FIG. 5A. Poses corresponding to the other solutions are scenes that the camera 40 is impossible to implement under a practical physical condition, for example, a case that a photographing direction of the camera 40 is opposite to a photographed object (as shown in FIG. 5B, FIG. 5C, and FIG. 5D. Therefore, a correct combination of the displacement matrix W and the rotation matrix R needs to be selected.

Specifically, referring to FIGS. 5A-5D, the camera 40 photographs the object 200 at the first position G1 to obtain a first frame of image P1, and photographs the object 200 at the second position G2 to obtain a second frame of image P2. Poses of the camera 40 corresponding to the four sets of solutions obtained by performing singular value decomposition on the essential matrix E are respectively shown in FIG. 5A, FIG. 5B, FIG. 5C, and FIG. 5D. In a scene as shown in FIG. 5A, photographing directions of the camera 40 at a first position G1 and a second position G2 both face the object 200, which is an actual photographing direction of the camera 40. In a scene as shown in FIG. 5B, a photographing direction of the camera 40 at a first position G1 faces the object 200 while a photographing direction at a second position G2 is opposite to the object 200, which is a virtually impossible scene. In a scene as shown in FIG. 5C, a photographing direction of the camera 40 at a first position G1 is opposite to the object 200 while a photographing direction at a second position G2 faces the object 200, which is also a virtually impossible scene. In a scene as shown in FIG. 5D, photographing directions of the camera 40 at a first position G1 and a second position G2 both do not face the object 200, which is also a virtually impossible scene. Therefore, a correct combination of the displacement matrix W and the rotation matrix R needs to be selected, so that an eventually obtained pose can accurately reflect an actual pose of the camera 40 both numerically and directionally, thereby ensuring accurate localization of monocular visual SLAM.

Referring to FIG. 5, in some implementations, depth values of feature points in any one of the feature point pairs may be calculated according to each set of solutions among the four sets of solutions obtained after the singular value decomposition of the essential matrix E. The only set of solutions among the four sets of solutions satisfying that depth values of pixel values of feature points are all positive values is a set of solutions that can reflect the actual pose of the camera 40. In this way, the correct combination of the displacement matrix W and the rotation matrix R can be selected. However, when determining whether two feature points in two frames of images belong to a same feature point pair, that is, when feature point matching is performed to determine a feature point pair, there is usually a matching error. For example, two feature points in a feature point pair are not feature points corresponding to a same feature due to insufficient matching accuracy, a relatively large quantity of similar feature points, a relatively low quality of acquired images, image noise interference, a relatively large difference in perspectives of the two images, and other factors. Depth values of feature points calculated according to a feature point pair with a matching error have a relatively low accuracy. Consequently, a combination of the displacement matrix W and the rotation matrix R selected by calculating the depth values of the feature points is not accurate, and an obtained pose of the camera 40 corresponding to the combination of the displacement matrix W and the rotation matrix R may be any one of the poses of the camera 40 shown in FIG. 5B, FIG. 5C, and FIG. 5D. Therefore, the localization of monocular visual SLAM is inaccurate or fails.

In this implementation of this application, on the one hand, the to-be-selected rotation matrices and the to-be-selected displacement matrices are obtained by using a monocular visual SLAM method according to the pixel coordinate values of the feature points in the feature point pairs; and on the other hand, the rotation angular velocities and the accelerations of the camera 40 are detected by using hardware devices such as a gyroscope and an accelerometer, to obtain the reference rotation matrix of the camera 40 according to the rotation angular velocities, and obtain the reference displacement matrix of the camera 40 according to the accelerations. Finally, the to-be-selected rotation matrices and the to-be-selected displacement matrices are filtered according to the reference rotation matrix and the reference displacement matrix. The rotation angular velocities and the accelerations of the camera 40 are detected by the hardware device based on actual photographing directions of the camera 40. Therefore, by filtering the to-be-selected rotation matrices and the to-be-selected displacement matrices according to the reference rotation matrix and the reference displacement matrix, the filtering accuracy can be ensured, so that an accurate to-be-selected rotation matrix and to-be-selected displacement matrix are selected, thereby obtaining an accurate pose of the camera 40, and improving the accuracy of localization.

Descriptions are further provided below with reference to the accompanying drawings.

Referring to FIG. 1, 01: Obtain rotation angular velocities and accelerations of a camera 40 cyclically. Specifically, the rotation angular velocities and the accelerations of the camera 40 may be cyclically obtained by using hardware devices such as a gyroscope and an accelerometer.

Referring to FIG. 2, in some implementations, the terminal 100 may further include a gyroscope 61 and an accelerometer 62. The gyroscope 61 is configured to obtain the rotation angular velocities of the camera 40. The accelerometer 62 is configured to obtain the accelerations of the camera 40. In one embodiment, the terminal 100 may include a six-axis micro-electromechanical system (MEMS) 60. The six-axis MEMS 60 is integrated with a three-axis accelerometer and a three-axis gyroscope, and can accurately detect a rotation angular velocity and an acceleration of the camera 40 in a three-dimensional space. Further, when the rotation angular velocity of the camera 40 is obtained, data on three orthogonal measuring axes of the three-axis gyroscope 61 are acquired simultaneously, to obtain components of the rotation angular velocity of the camera 40 on the three measuring axes of the three-axis gyroscope 61 at a same moment, thereby ensuring that rotation angular velocity components that correspond to the acquired rotation angular velocity on three coordinate axes of a space coordinate system have simultaneity, and accurately reflecting the rotation angular velocity of the camera 40 at the same moment. Similarly, when the acceleration of the camera 40 is obtained, data on three orthogonal measuring axes of the three-axis accelerometer 62 are acquired simultaneously, to obtain components of the acceleration of the camera 40 on the three measuring axes of the three-axis accelerometer 62 at a same moment, thereby ensuring that the acceleration components that correspond to the acquired acceleration on three coordinate axes of a space coordinate system have simultaneity, and accurately reflecting the acceleration of the camera 40 at the same moment.

Figure 6:
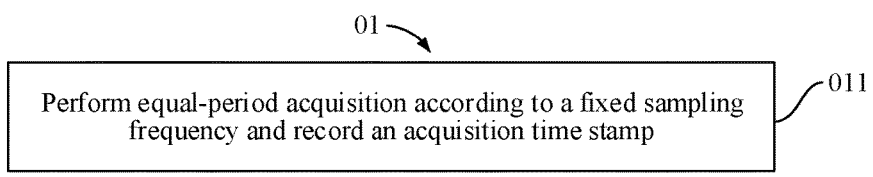
FIG. 6 is a schematic flowchart of a data processing method according to some implementations of this application.

Referring to FIG. 6, in some implementations, the method 01: obtaining rotation angular velocities and accelerations of a camera 40 cyclically includes:

011: Performing equal-period acquisition according to a fixed sampling frequency and record an acquisition time stamp.

Referring to FIG. 2, in some implementations, the programs further include instructions for performing the foregoing data processing method 011. The processors 30 may be further configured to perform the method 011. That is, the processors 30 may be further configured to: perform equal-period acquisition according to a fixed sampling frequency and recording an acquisition time stamp.

Referring to FIG. 3, in some implementations, the obtaining module 11 may be further configured to perform the method 011. That is, the obtaining module 11 may be further configured to: perform equal-period acquisition according to a fixed sampling frequency and recording an acquisition time stamp.

Figure 7:
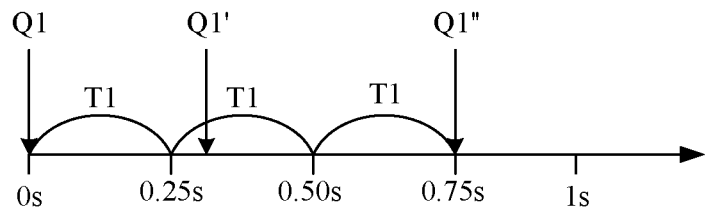
FIG. 7 is a schematic diagram of an application scenario of a data processing method according to some implementations of this application.
Figure 7:
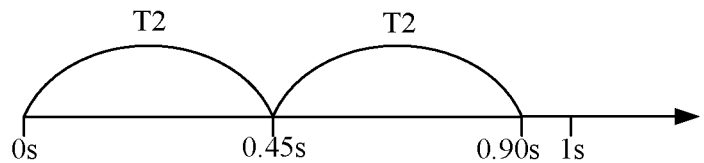

Referring to FIG. 7, the sampling frequency includes a sampling frequency f1 for acquiring the rotation angular velocity and a sampling frequency f2 of acquiring the acceleration. The sampling frequency is a quantity of times of sampling within a unit time. For example, if the unit time is 1 second, and one sampling is performed in 1 second, the sampling frequency is 1 time/second.

An acquisition period includes an acquisition period T1 corresponding to finishing one rotation angular velocity acquisition and an acquisition period T2 corresponding to finishing one acceleration acquisition. Equal-period acquisition specifically refers to that intervals of acquisition periods T1 are equal, and/or intervals of periods T2 are equal. For example, if the sampling frequency f2 of acquiring the acceleration is 2 times/second, and the acquisition period T2 corresponding to each time of sampling is 0.5 seconds, the acceleration is sampled twice within 1 second, and the duration for each acquisition is 0.5 seconds.

Recording the acquisition time stamp includes recording an acquisition time stamp Q1 corresponding to a moment at which the rotation angular velocity is acquired and an acquisition time stamp Q2 corresponding to a moment at which the acceleration is acquired. Taking the acquisition time stamp Q1 as an example, the acquisition time stamp Q1 may be a start moment of the acquisition period T1 of acquiring the rotation angular velocity, or an end moment of the acquisition period T1, or a moment between the start moment and the end moment of the acquisition period T1, which is not limited herein. Similarly, the acquisition time stamp Q2 may be a start moment of the acquisition period T2 of acquiring the acceleration, or an end moment of the acquisition period T2, or a moment between the start moment and the end moment of the acquisition period T2, which is not limited herein.

Figure 8:
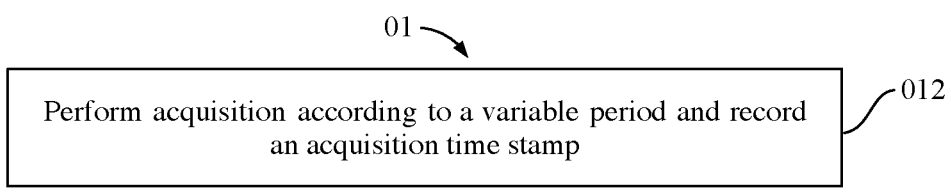
FIG. 8 is a schematic flowchart of a data processing method according to some implementations of this application.

Referring to FIG. 8, in some implementations, the method 01: obtaining rotation angular velocities and accelerations of a camera 40 cyclically alternatively includes:

012: Perform acquisition according to a variable period and record an acquisition time stamp.

Referring to FIG. 2, in some implementations, the programs further include instructions for performing the foregoing data processing method 012. The processors 30 may be further configured to perform the method 012. That is, the processors 30 may be further configured to: perform acquisition according to a variable period and record an acquisition time stamp.

Referring to FIG. 3, in some implementations, the obtaining module 11 may be further configured to perform the method 012. That is, the obtaining module 11 may be further configured to: perform acquisition according to a variable period and record an acquisition time stamp.

Figure 9:
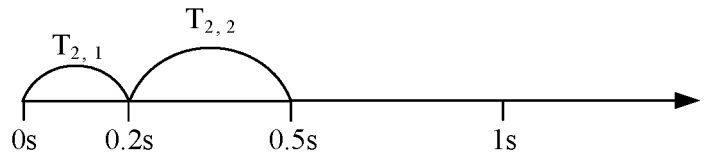
FIG. 9 is a schematic diagram of an application scenario of a data processing method according to some implementations of this application.

Referring to FIG. 9, variable-period acquisition refers to that a plurality of acquisition periods T1 corresponding to acquiring the rotation angular velocities include at least two different acquisition periods, and/or a plurality of acquisition periods T2 corresponding to acquiring the accelerations include at least two different acquisition periods. For example, the acceleration is acquired twice within a time period from the 0th second to the 1st second. The first acquisition of the acceleration is at the 0th second, and an acquisition period $T_{2,1}$ corresponding to the first acquisition is 0.2 seconds. The second acquisition of the acceleration is at the 0.5th second, and an acquisition period $T_{2,2}$ corresponding to the second acquisition is 0.3 seconds.

Figure 10:
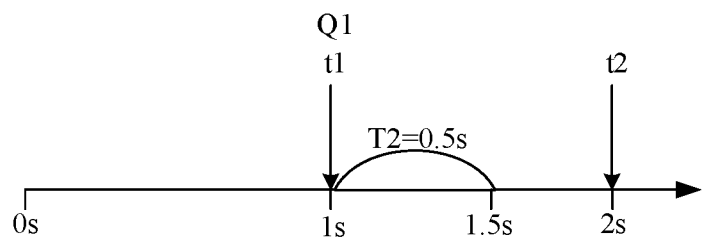
FIG. 10 is a schematic diagram of an application scenario of a data processing method according to some implementations of this application.

Referring to FIG. 1, FIG. 4, and FIG. 10. in some implementations, time periods of obtaining the rotation angular velocities and the accelerations of the camera 40 cyclically fall within a time period of acquiring the two frames of images. Specifically, the to-be-selected rotation matrices and the to-be-selected displacement matrices reflect poses of the camera 40 in the time period of acquiring the two frames of images. Therefore, the time periods of obtaining the rotation angular velocities and the accelerations of the camera 40 cyclically need to fall within the time period of acquiring the two frames of images. In this way, the reference rotation matrix of the camera 40 obtained according to the rotation angular velocities and the reference displacement matrix of the camera 40 obtained according to the accelerations can both reflect the pose of the camera 40 in the time period of acquiring the two frames of images, so that the to-be-selected rotation matrices and the to-be-selected displacement matrices can be filtered according to the reference rotation matrix and the reference displacement matrix.

The two frames of images specifically refer to two obtained frames of images which are temporally adjacent. Taking acquiring the acceleration of the camera 40 as an example. A time period of obtaining the acceleration may be represented as the acquisition period T2 corresponding to finishing one acceleration acquisition. The time period of obtaining the acceleration falls within the time period of acquiring the two frames of images, which may specifically refer to that the start moment of the acquisition period T2 is later than or equal to a first moment t1 of acquiring the first frame of image P1, and the end moment of the acquisition period T2 is earlier than a second moment t2 of acquiring the second frame of image P2. For example, if the camera 40 acquires the image P1 at the 1st second, and acquires the image P2 at the 2nd second, and the sampling frequency f2 of acquiring the acceleration is 1 time/second, the acceleration is acquired once in the time period of acquiring the two frames of images, and the acquisition period T2 corresponding to acquiring the acceleration needs to be less than or equal to 1 second, so that the time period of obtaining the acceleration falls within the time period of acquiring the two frames of images. If the acquisition period T2 corresponding to acquiring the acceleration is 0.5 seconds, the start moment of the acquisition period T2 cannot be earlier than the 1st second at the earliest. Otherwise, part of the acquisition period T2 will fall beyond the time period of acquiring the image P1 and the image P2. In addition, the start moment of the acquisition period T2 cannot be later than the 1.5th second at the latest. Otherwise, the end moment of the acquisition period T2 will be later than the 2nd second, causing part of the acquisition period T2 to fall beyond the time period of acquiring the image P1 and the image P2. The time period of obtaining the rotation angular velocity of the camera 40 is similar to the time period of obtaining the acceleration mentioned above, which is not described in detail herein.

Referring to FIG. 1, FIG. 4, and FIG. 10, further, In one embodiment, a start moment of each acquisition period T1 corresponding to acquiring the rotation angular velocity is the same as a moment of acquiring a frame of image, and an acquisition time stamp Q1 corresponding to acquiring the rotation angular velocity is used to record the start moment of the acquisition period T1. In this case, an image corresponding to a rotation angular velocity corresponding to the acquisition time stamp Q1 can be determined according to a moment corresponding to the acquisition time stamp Q1.

Figure 11:
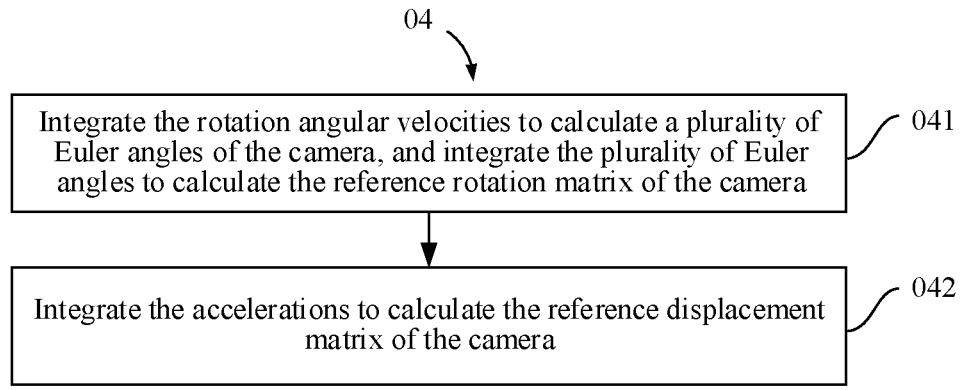
FIG. 11 is a schematic flowchart of a data processing method according to some implementations of this application.

Referring to FIG. 11, in some implementations, the method 04: obtaining a reference rotation matrix of the camera 40 according to the rotation angular velocities, and obtaining a reference displacement matrix of the camera 40 according to the accelerations includes:

041: Integrating the rotation angular velocities to calculate a plurality of Euler angles of the camera 40, and integrating the plurality of Euler angles to calculate the reference rotation matrix of the camera 40; and 042: Integrating the accelerations to calculate the reference displacement matrix of the camera 40.

Referring to FIG. 2, in some implementations, the programs further include instructions for performing the foregoing data processing methods 041 and 042. The processors 30 may be further configured to perform the methods 041 and 042. That is, the processors 30 may be further configured to: integrate the rotation angular velocities to calculate a plurality of Euler angles of the camera 40, and integrate the plurality of Euler angles to calculate the reference rotation matrix of the camera 40; and integrate the accelerations to calculate the reference displacement matrix of the camera 40.

Referring to FIG. 3, in some implementations, the obtaining module 11 may be further configured to perform the methods 041 and 042. That is, the obtaining module 11 may be further configured to: integrate the rotation angular velocities to calculate a plurality of Euler angles of the camera 40, and integrate the plurality of Euler angles to calculate the reference rotation matrix of the camera 40; and integrate the accelerations to calculate the reference displacement matrix of the camera 40.

Referring to FIG. 4 and FIG. 10, In one embodiment, the processors 30 obtain the first moment t1 corresponding to acquiring the first frame of image P1 and the second moment t2 corresponding to acquiring the second frame of image P2, filter out an acquisition time stamp $Q_{1,1}$ corresponding to the first moment t1 and an acquisition time stamp $Q_{1,2}$ corresponding to the second moment t2 from a plurality of acquisition time stamps Q1 of acquiring the rotation angular velocities, and determine a corresponding first rotation angular velocity ω1 according to the acquisition time stamp $Q_{1,1}$ and determine a corresponding second rotation angular velocity ω2 according to the acquisition time stamp $Q_{1,2}$. The first rotation angular velocity ω1 and the second rotation angular velocity ω2 each include velocity components on three orthogonal axes of a space coordinate system. Three Euler angles θ(pitch), θ(yaw), and θ(roll) corresponding to the camera 40 on the pitch axis, the yaw axis, and the roll axis in a time period from the first moment t1 to the second moment t2 can be calculated by integrating the first rotation angular velocity ω1 and the second rotation angular velocity ω2. θ(pitch), θ(yaw), and θ(roll) are all three-row and three-column matrices, and a product of θ(pitch), θ(yaw), and θ(roll) is the calculated reference rotation matrix Rm.

In one embodiment, at least two accelerations are acquired between the first moment t1 corresponding to acquiring the first frame of image P1 and the second moment t2 corresponding to acquiring the second frame of image P2. The processors 30 obtain the first moment t1 and the second moment t2, and filter out acquisition time stamps $Q_{2,n}$ between the first moment t1 and the second moment t2 from a plurality of acquisition time stamps Q2 of acquiring the accelerations, where n is a natural number greater than or equal to 1. According to the acquisition time stamps $Q_{2,n}$, accelerations An respectively corresponding to the acquisition time stamps $Q_{2,n}$ can be determined. The accelerations An are integrated to calculate a reference displacement matrix Wm of the camera 40.

Referring to FIGS. 5A-5D, The reference rotation matrix Rm can reflect a rotation angle of the camera 40 in the time period of acquiring the two frames of images, and the reference displacement matrix Wm can reflect displacement of the camera 40 in the time period of acquiring the two frames of images. The photographing directions of the camera 40 are certainly photographing directions shown in FIG. 5A when the camera 40 actually acquires the object and captures the two frames of images. Therefore, the rotation angular velocity of the camera 40 and the acceleration of the camera 40 detected and obtained by using the hardware devices in the time period in which the camera 40 acquires the two frames of images similarly correspond to the photographing scene shown in FIG. 5A.

Therefore, regardless of the accuracy of a rotation angle of the camera 40 that can be obtained according to the reference rotation matrix Rm, and regardless of the accuracy of displacement of the camera 40 that can be obtained according to the reference displacement matrix Wm, at least a pose of the camera 40 corresponding to the reference rotation matrix Rm and the reference displacement matrix Wm can correspond to the photographing directions of the camera 40 shown in FIG. 5A. That is, a pose of the camera 40 corresponding to the reference rotation matrix Rm and the reference displacement matrix Wm is a pose in which the photographing directions both face the object when the camera 40 acquires the two frames of images. In this way, a set of a to-be-selected rotation matrix and a to-be-selected displacement matrix that is capable of reflecting an actual pose of the camera 40 can be selected from a combination of the to-be-selected rotation matrices and the to-be-selected displacement matrices by filtering the to-be-selected rotation matrices and the to-be-selected displacement matrices according to the reference rotation matrix Rm and the reference displacement matrix Wm.

Referring to FIG. 1, 02: Obtaining a plurality of feature point pairs in two frames of images acquired by the camera 40, and obtaining pixel coordinate values of feature points in the feature point pairs, where each of the feature point pairs includes two feature points that correspond to a same feature of a same object and that are respectively in the two frames of images.

In one embodiment, Gaussian filter may be performed on the two frames of images acquired by the camera 40, and a Hessian matrix is constructed, to preliminarily generate interest points with obvious edge features and/or obvious brightness features in the two frames of images, where an interest point is a pixel point. In addition, corresponding scale spaces are respectively constructed for the two frames of images, and a comparison is performed between a feature value of an interest point and a feature value of an adjacent pixel point in a three-dimensional neighborhood of the scale space. If the feature value of the interest point is the greatest, the interest point is retained as a to-be-matched point. The feature value may include an edge feature value, a brightness feature, or the like, which is not limited herein. After a plurality of to-be-matched points in the two frames of images are obtained, Euclidean distances between a to-be-matched point in one frame of image and to-be-matched points in an other frame of image are respectively calculated. A to-be-matched point corresponding to a shortest Euclidean distance in the other frame of image and the to-be-matched point form a feature point pair. The two to-be-matched points forming the feature point pair are two feature points. By analogy, to-be-matched points in the other frame of image respectively matching to-be-matched points in the frame of image are calculated to obtain a plurality of feature point pairs in the two frames of images acquired by the camera 40. The manner of obtaining the feature point pairs is not limited to the manner in this embodiment, and no limitations are made hereto.

Figure 12:
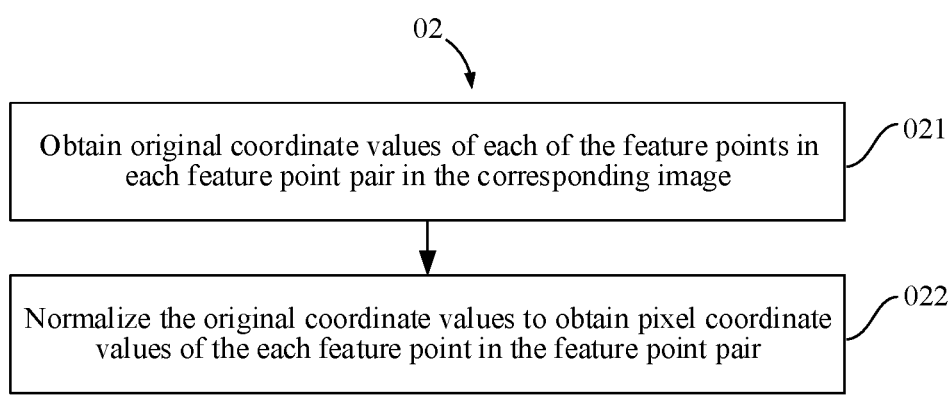
FIG. 12 is a schematic flowchart of a data processing method according to some implementations of this application.

Referring to FIG. 12, in some implementations, the method 02: obtaining a plurality of feature point pairs in two frames of images acquired by the camera 40, and obtaining pixel coordinate values of feature points in the feature point pairs, where each of the feature point pairs includes two feature points that correspond to a same feature of a same object and that are respectively in the two frames of images includes:

021: Obtaining original coordinate values of each of the feature points in each feature point pair in the corresponding image; and

022: Normalizing the original coordinate values to obtain pixel coordinate values of each feature point in the feature point pair.

Referring to FIG. 2, in some implementations, the programs further include instructions for performing the foregoing data processing methods 021 and 022. The processors 30 may be further configured to perform the methods 021 and 022. That is, the processors 30 may be further configured to: obtain original coordinate values of each of the feature points in each feature point pair in the corresponding image; and normalize the original coordinate values to obtain pixel coordinate values of each feature point in the feature point pair.

Referring to FIG. 3, in some implementations, the obtaining module 11 may be further configured to perform the methods 021 and 022. That is, the obtaining module 11 may be further configured to: obtain original coordinate values of each of the feature points in each feature point pair in the corresponding image; and normalize the original coordinate values to obtain pixel coordinate values of each feature point in the feature point pair.

Referring to FIG. 4, specifically, the original coordinate values of the feature point in the corresponding image are spatial coordinate values of the feature point in the corresponding images. For example, original coordinate values of the feature point D1 in the first frame of image P1 of the two frames of images is (x1, y1, z1). The coordinate x1 and the coordinate y1 are plane coordinates of the feature point D1 in a two-dimensional plane of the image P1, and z1 is a depth of the feature point D1. Normalization is a process of normalizing the depth among the original coordinate values, to eliminate the impact of internal parameters of the camera 40 on coordinate values of the feature point, and convert the original coordinate values corresponding to the feature point into the pixel coordinate values. For example, pixel coordinate values (x1, y1, 1) of the feature point D1 are obtained after the original coordinate values of the feature point D1 in the first frame of image P1 are normalized, and pixel coordinate values (x2, y2, 1) of the feature point D2 are obtained after original coordinate values of the feature point D2 that is in the second frame of image P2 and corresponds to the feature point D1 are normalized.

Figure 13:
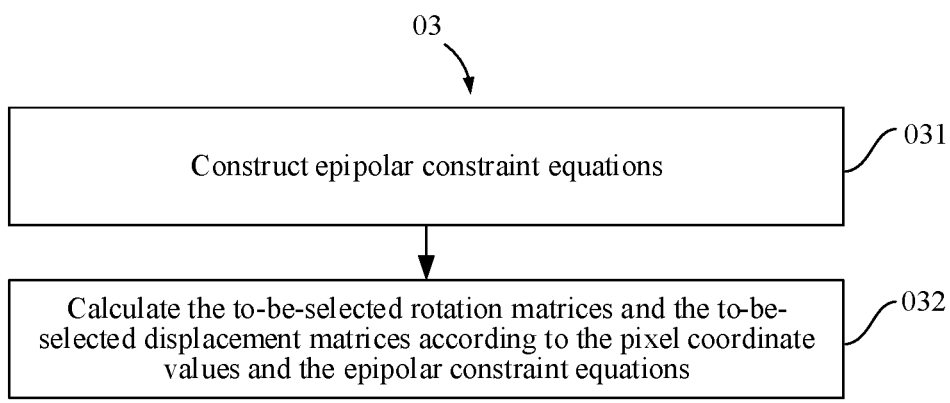
FIG. 13 is a schematic flowchart of a data processing method according to some implementations of this application.

Referring to FIG. 13, in some implementations, the method 03: obtaining to-be-selected rotation matrices and to-be-selected displacement matrices according to the pixel coordinate values includes:

031: Constructing epipolar constraint equations; and

032: Calculating the to-be-selected rotation matrices and the to-be-selected displacement matrices according to the pixel coordinate values and the epipolar constraint equations.

Referring to FIG. 2, in some implementations, the programs further include instructions for performing the foregoing data processing methods 031 and 032. The processors 30 may be further configured to perform the methods 031 and 032. That is, the processors 30 may be further configured to: construct epipolar constraint equations; and calculate the to-be-selected rotation matrices and the to-be-selected displacement matrices according to the pixel coordinate values and the epipolar constraint equations.

Referring to FIG. 3, in some implementations, the obtaining module 11 may be further configured to perform the methods 031 and 032. That is, the obtaining module 11 may be further configured to: construct epipolar constraint equations; and calculate the to-be-selected rotation matrices and the to-be-selected displacement matrices according to the pixel coordinate values and the epipolar constraint equations.

Referring to FIG. 4, for example, the pixel coordinate values of the feature point D1 in the first frame of image P1 are (x1, y1, 1), which are represented as $[x1, y1,]^T$ in the form of matrix, and the pixel coordinate values of the feature point D2 that is in the second frame of image P2 and corresponds to the feature point D1 are (x2, y2, 1), which are represented as $[x2, y2, 1]^T$ in the form of matrix. An epipolar constraint equation can be constructed according to an epipolar constraint relationship between the feature point D1 and the feature point D2: $U^T E V = 0$. Wherein U=[x1, y1,]T, $V=[x2, y2, 1]^T$, E is an essential matrix, and E=W×R, where W is a displacement matrix of the camera 40, and R is a rotation matrix of the camera 40. The superscript T indicates the transposition of the matrix. In this way, an epipolar constraint equation corresponding to a feature point pair can be constructed, where the epipolar constraint equation may be expanded as:

$$(x1 \quad y1 \quad 1) \begin{bmatrix} e1 & e2 & e3 \\ e4 & e5 & e6 \\ e7 & e8 & e9 \end{bmatrix} \begin{pmatrix} x2 \\ y2 \\ 1 \end{pmatrix} = 0,$$

that is [x1x2 x1y2 x1 y1x2 y1y2 x2 y2 1]·e=0 Wherein, e=$[e1\ e2\ e3\ e4\ e5\ e6\ e7\ e8\ e9]^T$ indicates the degree of freedom of the essential matrix E.

In an implementation of this application, n epipolar constraint equations respectively corresponding to n feature point pairs can be constructed, and the degree of freedom e in the foregoing equation can be calculated according to the n epipolar constraint equations, to calculate solutions of the epipolar constraint equations. Wherein, n is a natural number greater than or equal to 8. Taking n=8 as an example, $(x_1^i, y_1^i, 1)$ is used to indicate pixel coordinate values of a feature point of the ith feature point pair in the first frame of image, and $(x_2^i, y_2^i, 1)$ is used to indicate pixel coordinate values of a feature point of the ith feature point pair in the second frame of image, where i=1, 2, 3, 4, 5, 6, 7, or 8. 8 epipolar constraint equations corresponding to 8 feature point pairs have the following relationship:

$$\begin{pmatrix} x_1^1 x_2^1 & x_1^1 y_2^1 & x_1^1 & y_1^1 x_2^1 & y_1^1 y_2^1 & x_2^1 & y_2^1 & 1 \\ x_1^2 x_2^2 & x_1^2 y_2^2 & x_1^2 & y_1^2 x_2^2 & y_1^2 y_2^2 & x_2^2 & y_2^2 & 1 \\ & & & \cdots & & & & \\ x_1^8 x_2^8 & x_1^8 y_2^8 & x_1^8 & y_1^8 x_2^8 & y_1^8 y_2^8 & x_2^8 & y_2^8 & 1 \end{pmatrix} \cdot e = 0.$$

The essential matrix E can be obtained by individually substituting pixel coordinate values of feature points in the 8 feature point pairs into the foregoing equation. Singular value decomposition is performed on the obtained essential matrix E to obtain the following relationship: $E = U\Sigma V^T$, and $R_{s1} = UR_z(\pi/2)V^T$, $R_{s2} = UR_z(\pi/-2)V^T$, $W_{s1} = \pm UR_z(\pi/2)U^T$, and $W_{s2} = \pm UR_z(\pi/-2)U^T$ are respectively obtained. The to-be-selected rotation matrices include $R_{s1}$ and $R_{s2}$, and the to-be-selected displacement matrices include $W_{s1}$ and $W_{s2}$. $R_z(\emptyset)$ indicates a corresponding rotation matrix R rotating around the z-axis in the three-dimensional spatial coordinate system by a particular angle. In the foregoing equation, $\emptyset = \pm \pi/2$. $UR_z(\pi/2)U^T$ and $-UR_z(\pi/2)U^T$ represent a same displacement matrix, so that any one of $UR_z(\pi/2)U^T$ and $-UR_z(\pi/2)U^T$ may be used as the to-be-selected displacement matrix $W_{s1}$. Similarly, any one of $UR_z(\pi/-2) U^T$ and $-UR_z(\pi/-2)U^T$ may be used as the to-be-selected displacement matrix $W_{s2}$.

Referring to FIGS. 5A-5D, the pose of the camera 40 may be determined by a combination of a rotation matrix R and a displacement matrix W. For the to-be-selected rotation matrices $R_{s1}$ and $R_{s2}$, and the to-be-selected displacement matrices $W_{s1}$ and $W_{s2}$, there are total four combinations of a rotation matrix R and a displacement matrix W respectively corresponding to the poses of the camera 40 shown in FIG. 5A, FIG. 5B, FIG. 5C, and FIG. 5D, where only the pose of the camera 40 shown in FIG. 5A is the actual pose of the camera 40. In an implementation of this application, a to-be-selected rotation matrix and a to-be-selected displacement matrix corresponding to the pose of the camera 40 shown in FIG. 5A can be selected by using the method 05 in the data processing method.

Figure 14:
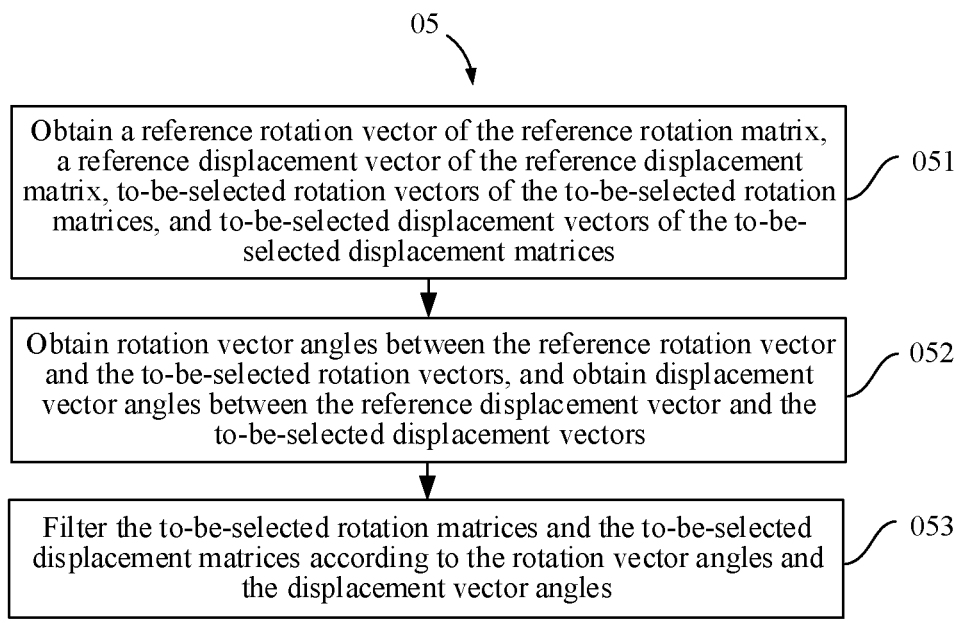
FIG. 14 is a schematic flowchart of a data processing method according to some implementations of this application.

Referring to FIG. 14, in some implementations, the method 05: filtering the to-be-selected rotation matrices and the to-be-selected displacement matrices according to the reference rotation matrix and the reference displacement matrix includes:

051: Obtaining a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices;

052: Obtaining rotation vector angles between the reference rotation vector and the to-be-selected rotation vectors, and obtain displacement vector angles between the reference displacement vector and the to-be-selected displacement vectors; and 053: Filtering the to-be-selected rotation matrices and the to-be-selected displacement matrices according to the rotation vector angles and the displacement vector angles.

Referring to FIG. 2, in some implementations, the programs further include instructions for performing the foregoing data processing methods 051, 052, and 053. The processors 30 may be further configured to perform the methods 051, 052, and 053. That is, the processors 30 may be further configured to: obtain a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices; obtain rotation vector angles between the reference rotation vector and the to-be-selected rotation vectors, and obtain displacement vector angles between the reference displacement vector and the to-be-selected displacement vectors; and filter the to-be-selected rotation matrices and the to-be-selected displacement matrices according to the rotation vector angles and the displacement vector angles.

Referring to FIG. 3, in some implementations, the filtering module 12 may be further configured to perform the methods 051, 052, and 053. That is, the filtering module 12 may be further configured to: obtain a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices; obtain rotation vector angles between the reference rotation vector and the to-be-selected rotation vectors, and obtain displacement vector angles between the reference displacement vector and the to-be-selected displacement vectors; and filter the to-be-selected rotation matrices and the to-be-selected displacement matrices according to the rotation vector angles and the displacement vector angles.

Specifically, for the rotation matrix R, there is the following relationship: $R\lambda_R = \cos\theta\,\lambda_R + (1+\cos\theta)\lambda_R | \lambda_2 K + \sin\theta\, K\lambda_R$, where K is a rotation axis unit vector, and $\lambda_R$ is a rotation vector corresponding to the rotation matrix R. There is the following relationship between the rotation matrix R and the rotation vector $\lambda_R$: $\lambda_{R\theta} = R\lambda_R$. The vector $\lambda_{R\theta}$ is a vector obtained after the vector $\lambda_R$ rotates by an angle of $\theta$. The rotation vector $\lambda_R$ corresponding to the rotation matrix R can be determined according to the foregoing two relations. In this way, a reference rotation vector $\lambda_{Rm}$ corresponding to the reference rotation matrix Rm can be obtained according to the reference rotation matrix Rm; a to-be-selected rotation vector $\lambda_{Rs1}$ corresponding to the to-be-selected rotation matrix $R_{s1}$ can be obtained according to the to-be-selected rotation matrix $R_{s1}$; and a to-be-selected rotation vector $\lambda_{Rs2}$ corresponding to the to-be-selected rotation matrix $R_{s2}$ can be obtained according to the to-be-selected rotation matrix $R_{s2}$.

Further, the to-be-selected rotation matrix $R_{s1} = UR_z(\pi/2) V^T$, and the to-be-selected rotation matrix $R_{s2} = UR_z(\pi/-2) V^T$. The to-be-selected rotation vector $\lambda_{Rs1}$ and to-be-selected rotation vector $\lambda_{Rs2}$ can be determined as a pair of opposite vectors according to the relationship between $R_{s1}$ and $R_{s2}$.

For the displacement matrix W, the displacement matrix W is a product of components of a displacement vector $\lambda_W$ in the x-axis, y-axis, and z-axis in the three-dimensional spatial coordinate system in essence. Therefore, if the displacement matrix W is known, the displacement matrix W can be directly converted into the corresponding displacement vector $\lambda_W$. In this way, a reference displacement vector $\lambda_{Wm}$ corresponding to the reference displacement matrix Wm can be obtained according to the reference displacement matrix Wm; a to-be-selected displacement vector $\lambda_{Ws1}$ corresponding to the to-be-selected displacement matrix $W_i$ can be obtained according to the to-be-selected displacement matrix $W_{s1}$; and a to-be-selected displacement vector $\lambda_{Ws2}$ corresponding to the to-be-selected displacement matrix $W_{s2}$ can be obtained according to the to-be-selected displacement matrix $W_{s2}$.

Further, the to-be-selected displacement matrix $W_{s1} = \pm UR_z(\pi/2)U^T$, and the to-be-selected displacement matrix $W_{s2}=\pm UR_z(\pi/-2)U^T$. The to-be-selected displacement vector $\lambda_{Ws1}$ and to-be-selected displacement vector $\lambda_{Ws2}$ can be determined as a pair of opposite vectors according to the relationship between $W_{s1}$ and $W_{s2}$.

After the reference rotation vector $\lambda_{Rm}$, the to-be-selected rotation vector $\lambda_{Rs1}$, and the to-be-selected rotation vector $\lambda_{Rs2}$ are obtained, a rotation vector angle $\theta_{R1}$ between the reference rotation vector $\lambda_{Rm}$ and the to-be-selected rotation vector $\lambda_{Rs1}$ and a rotation vector angle $\theta_{R2}$ between the reference rotation vector $\lambda_{Rm}$ and the to-be-selected rotation vector $\lambda_{Rs1}$ can respectively be obtained, so that the to-be-selected rotation matrix can be selected according to the rotation vector angle $\theta_{R1}$ and the rotation vector angle $\theta_{R2}$. After the reference displacement vector $\lambda_{Wm}$, the to-be-selected displacement vector $\lambda_{Ws1}$, and the to-be-selected displacement vector $\lambda_{Ws2}$ are obtained, a displacement vector angle $\theta_{W1}$ between the reference displacement vector $\lambda_{Wm}$ and the to-be-selected displacement vector $\lambda_{Ws1}$ and a displacement vector angle $\theta_{W2}$ between the reference displacement vector $\lambda_{Wm}$ and the to-be-selected displacement vector $\lambda_{Ws2}$ can respectively be obtained, so that the to-be-selected displacement matrix can be selected according to the displacement vector angle $\theta_{W1}$ and the displacement vector angle $\theta_{W2}$.

Figure 15:
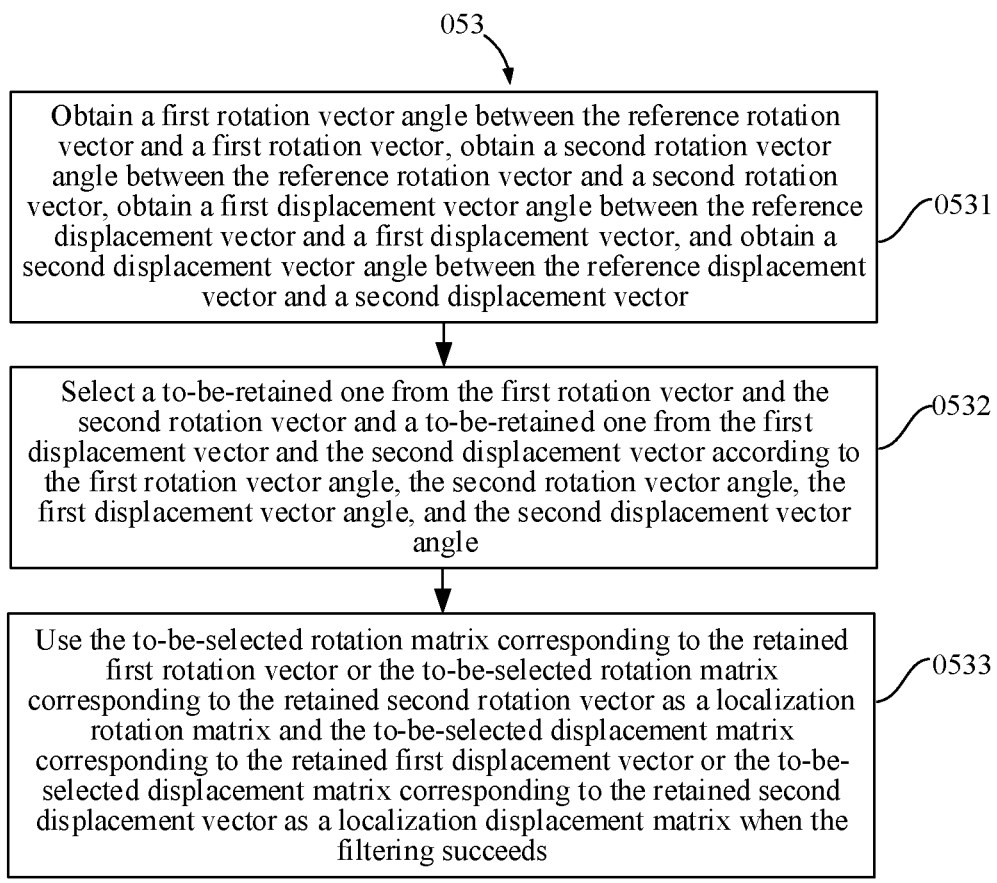
FIG. 15 is a schematic flowchart of a data processing method according to some implementations of this application.

Referring to FIG. 15, in some implementations, the to-be-selected rotation vectors include a first rotation vector and a second rotation vector, the to-be-selected displacement vectors include a first displacement vector and a second displacement vector, and the method 053: filtering the to-be-selected rotation matrices and the to-be-selected displacement matrices according to the rotation vector angles and the displacement vector angles includes:

0531: Obtaining a first rotation vector angle between the reference rotation vector and the first rotation vector, obtaining a second rotation vector angle between the reference rotation vector and the second rotation vector, obtaining a first displacement vector angle between the reference displacement vector and the first displacement vector, and obtaining a second displacement vector angle between the reference displacement vector and the second displacement vector;

0532: Selecting a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and

0533: Using the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix when the filtering succeeds.

Referring to FIG. 2, in some implementations, the programs further include instructions for performing the foregoing data processing methods 0531, 0532, and 0533. The processors 30 may be further configured to perform the methods 0531, 0532, and 0533. That is, the processors 30 may be further configured to: obtain a first rotation vector angle between the reference rotation vector and the first rotation vector, obtain a second rotation vector angle between the reference rotation vector and the second rotation vector, obtain a first displacement vector angle between the reference displacement vector and the first displacement vector, and obtain a second displacement vector angle between the reference displacement vector and the second displacement vector; select a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and use the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix when the filtering succeeds.

Referring to FIG. 3, in some implementations, the filtering module 12 may be further configured to perform the methods 0531, 0532, and 0533. That is, the filtering module 12 may be further configured to: obtain a first rotation vector angle between the reference rotation vector and the first rotation vector, obtain a second rotation vector angle between the reference rotation vector and the second rotation vector, obtain a first displacement vector angle between the reference displacement vector and the first displacement vector, and obtain a second displacement vector angle between the reference displacement vector and the second displacement vector; select a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and use the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix when the filtering succeeds.

Referring to FIGS. 5A-5D, a pose corresponding to the reference rotation matrix Rm and the reference displacement matrix Wm is the pose of the camera 40 shown in FIG. 5A. Therefore, the reference rotation vector $\lambda_{Rm}$ and the reference displacement vector $\lambda_{Wm}$ can correspond to the pose of the camera 40 shown in FIG. 5A. If a combination of a to-be-selected rotation matrix Rs and a to-be-selected displacement matrix Ws can correspond to the pose of the camera 40 shown in FIG. 5A, a to-be-selected rotation vector $\lambda_{Rs}$ corresponding to the to-be-selected rotation matrix Rs is to be in a same direction as the reference rotation vector $\lambda_{Rm}$, and a to-be-selected displacement vector $\lambda_{Ws}$ corresponding to the to-be-selected displacement matrix Ws is to be in a same direction as the reference displacement vector $\lambda_{Wm}$. Specifically, when and only when $\lambda_{Rs}$ and $\lambda_{Rm}$ are in the same direction and $\lambda_{Ws}$ and $\lambda_{Wm}$ are in the same direction, a pose of the camera 40 obtained according to the to-be-selected rotation matrix Rs and the to-be-selected displacement matrix Ws can correspond to the pose of the camera 40 shown in FIG. 5A. Otherwise, when $\lambda_{Rs}$ and $\lambda_{Rm}$ are in the same direction while $\lambda_{Ws}$ and $\lambda_{Wm}$ are not in the same direction, or $\lambda_{Ws}$ and $\lambda_{Wm}$ are in the same direction while $\lambda_{Rs}$ and $\lambda_{Rm}$ are not in the same direction, or $\lambda_{Rs}$ and $\lambda_{Rm}$ are not in the same direction and $\lambda_{Ws}$ and $\lambda_{Wm}$ are also not in the same direction, the pose of the camera 40 obtained according to the to-be-selected rotation matrix Rs and the to-be-selected displacement matrix Ws corresponds to the pose of the camera 40 shown in FIG. 5B, FIG. 5C or FIG. 5D. Therefore, a to-be-selected rotation vector $\lambda_{Rs}$ in the same direction as the reference rotation vector $\lambda_{Rm}$ needs to be selected from a plurality of to-be-selected rotation vectors $\lambda_{Rs}$, and a to-be-selected displacement vector $\lambda_{Ws}$ in the same direction as the reference displacement vector $\lambda_{Wm}$ needs to be selected from a plurality of to-be-selected displacement vectors Aws.

Specifically, whether a to-be-selected vector is in the same direction with a reference vector may be determined according to an angle between the to-be-selected vector and the reference vector. Taking the to-be-selected rotation vector $\lambda_{Rs}$ and the reference rotation vector $\lambda_{Rm}$ as an example. If an angle between the to-be-selected rotation vector $\lambda_{Rs}$ and the reference rotation vector $\lambda_{Rm}$ is less than 90°, the to-be-selected rotation vector $\lambda_{Rs}$ and the reference rotation vector $\lambda_{Rm}$ are considered in the same direction; otherwise, that is, if the angle between the to-be-selected rotation vector $\lambda_{Rs}$ and the reference rotation vector $\lambda_{Rm}$ is greater than or equal to 90°, the to-be-selected rotation vector $\lambda_{Rs}$ and the reference rotation vector $\lambda_{Rm}$ are considered not in the same direction. The implementations of this application are not limited to determining whether vectors are in the same direction according to whether an angle between the vectors is less than 90°, and can also use whether the angle between the vectors is less than 80°, 70°, 60°, 50°, 40°, 30°, 200 or 10°, and even whether the angle between the vectors is equal to 0° as a more strict judgment bases, which are not listed herein one by one. Similarly, whether the reference displacement vector $\lambda_{Wm}$ and the to-be-selected displacement vector $\lambda_{Ws}$ are in the same direction may be determined according to whether an angle between the reference displacement vector $\lambda_{Wm}$ and the to-be-selected displacement vector $\lambda_{Ws}$ is less than 90°.

As described above, the to-be-selected rotation vectors $\lambda_{Rs}$ include a first rotation vector $\lambda_{Rs1}$ and a second rotation vector $\lambda_{Rs2}$, a first rotation vector angle between the reference rotation vector $\lambda_{Rm}$ and the first rotation vector $\lambda_{Rs1}$ is $\theta_{R1}$, and a second rotation vector angle between the reference rotation vector $\lambda_{Rm}$ and the second rotation vector $\lambda_{Rs2}$ is $\theta_{R2}$.

The to-be-selected displacement vectors $\lambda_{Ws}$ include a first displacement vector $\lambda W_{s1}$ and a second displacement vector $\lambda_{W2}$, a displacement vector angle between the reference displacement vector $\lambda_{Wm}$ and the first displacement vector $\lambda_{Ws1}$ is $\theta_{W1}$, and a displacement vector angle between the reference displacement vector $\lambda Wm$ and the second displacement vector $\lambda_{Ws2}$ is $\theta_{W2}$.

A to-be-retained one can be selected from the first rotation vector $\lambda_{Rs1}$ and the second rotation vector $\lambda_{Rs2}$ and a to-be-retained one can be selected from the first displacement vector $\lambda_{Ws1}$ and the second displacement vector $\lambda_{Ws2}$ according to the first rotation vector angle $\theta_{R1}$, the second rotation vector angle $\theta_{R2}$, the first displacement vector angle $\theta_{W1}$, and the second displacement vector angle $\theta_{W2}$.

Figures 16, 17:
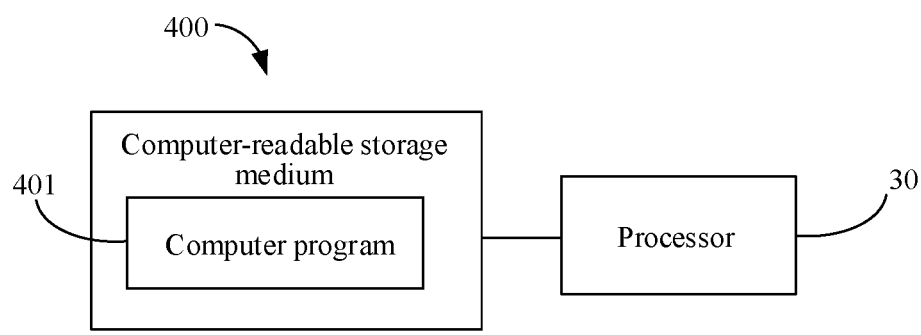
FIG. 16 is a schematic diagram of a judgment logic of data processing method according to some implementations of this application.
FIG. 17 is a schematic diagram of a connected state between a computer-readable storage medium and a processor according to some implementations of this application.

Referring to FIG. 16, specifically, in some implementations, the to-be-retained one is selected from the first rotation vector $\lambda_{Rs1}$ and the second rotation vector $\lambda_{Rs2}$ by determining a relationship between the first rotation vector angle $\theta_{R1}$ and 90° and a relationship between the second rotation vector angle $\theta_{R2}$ and 90°.

As described above, the first rotation vector $\lambda_{Rs1}$ and the second rotation vector $\lambda_{Rs2}$ obtained by using the monocular visual SLAM method are a pair of opposite vectors. Therefore, if the first rotation vector $\lambda_{Rs1}$ and the reference rotation vector $\lambda_{Rm}$ are in the same direction, the second rotation vector $\lambda_{Rs2}$ certainly cannot be in the same direction as the reference rotation vector $\lambda_{R}$m. Otherwise, a condition that the first rotation vector $\lambda_{Rs1}$ and the second rotation vector $\lambda_{Rs2}$ are a pair of opposite vectors is not met. Further, if the first rotation vector $\lambda_{Rs1}$ and the reference rotation vector $\lambda_{Rm}$ are in the same direction, the second rotation vector $\lambda_{Rs2}$ is certainly opposite to the reference rotation vector $\lambda_{Rm}$. That is, a case that the angle $\theta_{R2}$ between the second rotation vector $\lambda_{Rs2}$ and the reference rotation vector $\lambda_{Rm}$ is equal to 900 is excluded. This is because when the angle $\theta R_2$ is equal to 90°, according to the condition that the first rotation vector $\lambda_{Rs1}$ and the second rotation vector $\lambda_{Rs2}$ are a pair of opposite vectors, the angle $\theta R_1$ between the first rotation vector $\lambda_{Rs1}$ and the reference rotation vector $\lambda_{Rm}$ is also to be equal to 90°, which is not consistent with a condition that the first rotation vector $\lambda_{Rs1}$ and the reference rotation vector $\lambda_{Rm}$ are in the same direction.

Therefore, when and only when the first rotation vector angle $\theta_{R1}$ is less than 90°, and the second rotation vector angle $\theta_{R2}$ is greater than 90°, the first rotation vector $\lambda_{Rs1}$ is retained.

Similarly, if the second rotation vector $\lambda_{Rs2}$ and the reference rotation vector $\lambda_{Rm}$ are in the same direction, the first rotation vector $\lambda_{Rs1}$ is certainly opposite to the reference rotation vector $\lambda_{Rm}$. Therefore, when and only when the second rotation vector angle $\theta_{R2}$ is less than 90°, and the first rotation vector angle $\theta_{R1}$ is greater than 90°, the second rotation vector $\lambda_{Rs2}$ is retained.

Similarly, the first displacement vector $\lambda_{Ws1}$ and the second displacement vector $\lambda_{Ws2}$ are also a pair of opposite vectors. When and only when the first displacement vector angle $\theta_{W1}$ is less than 90°, and the second displacement vector angle $\theta_{W2}$ is greater than 90°, the first displacement vector $\lambda_{Ws1}$ is retained; and when and only when the second displacement vector angle $\theta_{W2}$ is less than 90°, and the first displacement vector angle $\theta_{W1}$ is greater than 90°, the second displacement vector $\lambda_{Ws2}$ is retained.

As shown in FIG. 16, there are totally 9 combinations of the relationship between the first rotation vector angle $\theta_{R1}$ and 90° and the relationship between the second rotation vector angle $\theta_{R2}$ and 90°. Only when the first rotation vector angle $\theta_{R1}$ is less than 900 and the second rotation vector angle $\theta_{R2}$ is greater than 90°, or when the second rotation vector angle $\theta_{R2}$ is less than 900 and the first rotation vector angle $\theta_{R1}$ is greater than 90°, the to-be-retained rotation vector $\lambda_{Rs}$ can be selected. If the relationship between the first rotation vector angle $\theta_{R1}$ and 90° and the relationship between the second rotation vector angle $\theta_{R2}$ and 90° belong to one of the remaining 7 combinations, filtering is considered unsuccessful. It is indicated that there is an error in the to-be-selected rotation matrix $R_{s1}$ and/or the to-be-selected rotation matrix $R_{s2}$ obtained using the monocular visual SLAM method, which may be caused by feature point matching inaccuracy or other reasons.

Similarly, there are total 9 combinations of the relationship between the first displacement vector angle $\theta_{W1}$ and 90° and the relationship between the second displacement vector angle $\theta_{W2}$ and 90°. Only when the first displacement vector angle $\theta_{W1}$ is less than 90° and the second displacement vector angle $\theta_{W2}$ is greater than 90°, or when the second displacement vector angle $\theta_{W2}$ is less than 90° and the first displacement vector angle $\theta_{W1}$ is greater than 90°, the to-be-retained displacement vector $\lambda_{Ws}$ can be selected. If the relationship between the first displacement vector angle $\theta_{W1}$ and 90° and the relationship between the second displacement vector angle $\theta_{W2}$ and 90° belong to one of the remaining 7 combinations, filtering is considered unsuccessful, which indicates that there is an error in the to-be-selected displacement matrix $W_{s1}$ and/or the to-be-selected displacement matrix $W_{s2}$ obtained by using the monocular visual SLAM method, and the error may be caused by inaccurate feature point matching or other reasons.

When the to-be-retained rotation vector $\lambda_{Rs}$ can be selected and the to-be-retained displacement vector $\lambda_{Ws}$ can be selected, filtering is considered successful. If a retained rotation vector $\lambda_{Rs}$ is the first rotation vector $\lambda_{Rs1}$, the to-be-selected rotation matrix $R_{s1}$ corresponding to the first rotation vector $\lambda_{Rs1}$ is used as a localization rotation matrix Rd. If a retained displacement vector $\lambda_{Ws}$ is the first displacement vector $\lambda_{Ws1}$, the to-be-selected displacement matrix $W_{s1}$ corresponding to the first displacement vector $\lambda W_{s1}$ is used as a localization displacement matrix Wd. If the retained displacement vector $\lambda_{Ws}$ is the second displacement vector $\lambda_{Ws2}$, the to-be-selected displacement matrix $W_{s2}$ corresponding to the second displacement vector $\lambda_{Ws2}$ is used as the localization displacement matrix Wd. A pose finally obtained according to the localization rotation matrix Rd and the localization displacement matrix Wd is the actual pose of the camera 40.

When the to-be-retained rotation vector $\lambda_{Rs}$ can be selected, but the to-be-retained displacement vector $\lambda_{Ws}$ is not successfully selected, or when the to-be-retained displacement vector $\lambda_{Ws}$ can be selected, but the to-be-retained rotation vector $\lambda_{Rs}$ is not successfully selected, or when both the to-be-retained rotation vector $\lambda_{Rs}$ and the to-be-retained displacement vector $\lambda_{Ws}$ are not successfully selected, steps 01, 02, 03, 04, and 05 of the data processing method provided in this application need to be performed again, until the to-be-retained rotation vector $\lambda_{Rs}$ and the to-be-retained displacement vector $\lambda_{Ws}$ can be selected.

In conclusion, through the data processing method provided in the implementations of this application, a combination of a to-be-selected rotation matrix and a to-be-selected displacement matrix for determining the pose of the camera 40 can be accurately selected from the plurality of to-be-selected rotation matrices and the plurality of to-be-selected displacement matrices obtained according to the epipolar constraint relationships of the feature point pairs in the two frames of images in the monocular visual SLAM method, thereby ensuring the accuracy of a posture and position obtained by using the monocular visual SLAM method and improving the accuracy of the localization.

Referring to FIG. 17, the implementations of this application further provide a non-transitory computer-readable storage medium 400 including a computer program 401. The computer program 401, when executed by one or more processors 30, causes the one or more processors 30 to perform the data processing method according to any one of the foregoing implementations. The non-transitory computer-readable storage medium 400 may be provided in a terminal 100, or may be provided in a cloud server or other apparatuses. In this case, the terminal 100 can communicate with the cloud server or other apparatuses to obtain the corresponding computer program 401.

Referring to FIG. 2, for example, the computer program 401, when executed by one or more processors 3030, causes the one or more processors 30 to perform the steps 01, 02, 03, 04, 05, 011, 012, 041, 042, 021, 022, 031, 032, 051, 052, 053, 0531, 0532, and 0533, for example, to perform the following data processing method:

01: Obtaining rotation angular velocities and accelerations of a camera 40 cyclically;

02: Obtaining a plurality of feature point pairs in two frames of images acquired by the camera 40, and obtaining pixel coordinate values of feature points in the feature point pairs, where each of the feature point pairs includes two feature points that correspond to a same feature of a same object and that are respectively in the two frames of images;

03: Obtaining to-be-selected rotation matrices and to-be-selected displacement matrices according to the pixel coordinate values;

04: Obtaining a reference rotation matrix of the camera 40 according to the rotation angular velocities, and obtain a reference displacement matrix of the camera 40 according to the accelerations; and 05: Filtering the to-be-selected rotation matrices and the to-be-selected displacement matrices according to the reference rotation matrix and the reference displacement matrix.

In another example, the computer program 401, when executed by the one or more processors 30, causes the one or more processors 30 to perform the following data processing method:

01: Obtaining rotation angular velocities and accelerations of a camera 40 cyclically;

021: Obtaining original coordinate values of each of the feature points in each feature point pair in the corresponding image;

022: Normalizing the original coordinate values to obtain pixel coordinate values of each feature point in the feature point pair;

031: Constructing epipolar constraint equations;

032: Calculating the to-be-selected rotation matrices and the to-be-selected displacement matrices according to the pixel coordinate values and the epipolar constraint equations;

04: Obtaining a reference rotation matrix of the camera 40 according to the rotation angular velocities, and obtaining a reference displacement matrix of the camera 40 according to the accelerations;

051: Obtaining a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices;

052: Obtaining rotation vector angles between the reference rotation vector and the to-be-selected rotation vectors, and obtaining displacement vector angles between the reference displacement vector and the to-be-selected displacement vectors; and 053: Filtering the to-be-selected rotation matrices and the to-be-selected displacement matrices according to the rotation vector angles and the displacement vector angles.

In the description of this specification, description of reference terms such as "some implementations", "in an example" or "exemplarily" means including specific characteristics, structures, materials, or features described in the implementation or example in at least one implementation or example of this application. In this specification, schematic descriptions of the foregoing terms are not necessarily with respect to the same implementation or example. In addition, the described specific characteristics, structures, materials, or features may be combined in a proper manner in any one or more implementations or examples. In addition, a person skilled in the art may integrate or combine different embodiments or examples described in the specification and features of the different embodiments or examples as long as they are not contradictory to each other.

Any process or methods the flowcharts or described herein in another manner may be understood as indicating a module, a segment, or a part including code of one or more executable instructions for implementing a particular logical function or process step. In addition, the scope of preferred implementations of this application includes other implementations which do not follow the order shown or discussed, including performing functions in a substantially simultaneous manner or in reverse order according to the functions involved. This should be understood by a person skilled in the art to which the embodiments of this application belong.

Although the implementations of this application are shown and described above, it may be understood that the foregoing implementations are exemplary, and cannot be understood as a limitation to this application. A person of ordinary skill in the art may make changes, modifications, replacements, and variations to the foregoing implementations without departing from the scope of this application.

What is claimed is:

1. A monocular visual simultaneous localization and mapping (SLAM) data processing method, comprising:
    obtaining rotation angular velocities and accelerations of a camera cyclically;
    obtaining a plurality of feature point pairs in two frames of images acquired by the camera, and obtaining pixel coordinate values of feature points in the feature point pairs, wherein each of the feature point pairs comprises two feature points that correspond to a same feature of a same object and that are respectively in the two frames of images;
    constructing epipolar constrict equations and calculating to-be-selected rotation matrices and to-be-selected displacement matrices according to pixel coordinate values and the epipolar constraint equations;
    obtaining a reference rotation matrix of the camera according to the rotation angular velocities of the camera, and obtaining a reference displacement matrix of the camera according to the accelerations of the camera; and
    filtering the to-be-selected rotation matrices and the to-be-selected displacement matrices according to the reference rotation matrix of the camera and the reference displacement matrix of the camera;
    wherein the filtering the to-be-selected rotation matrices and the to-be-selected displacement matrices according to the reference rotation matrix and the reference displacement matrix comprises:
        obtaining a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices;
        obtaining rotation vector angles between the reference rotation vector and the to-be-selected rotation vectors, and obtaining displacement vector angles between the reference displacement vector and the to-be-selected displacement vectors, and
        filtering the to-be-selected rotation matrices and the to-be-selected displacement matrices according to the rotation vector angles and the displacement vector angles; and
    wherein the to-be-selected rotation vectors comprise a first rotation vector and a second rotation vector, the to-be-selected displacement vectors comprise a first displacement vector and a second displacement vector, and the filtering the to-be-selected rotation matrices and the to-be-selected displacement matrices according to the rotation vector angles and the displacement vector angles comprises:
        obtaining first rotation vector angle between the reference rotation vector and the first rotation vector, obtaining a second rotation vector angle between the reference rotation vector and the second rotation vector, obtaining a first displacement vector angle between the reference displacement vector and the first displacement vector, and obtaining a second displacement vector angle between the reference displacement vector and the second displacement vector;
        selecting a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and
        using the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix.

2. A terminal, comprising:
    a camera, configured to acquire an image;
    one or mom processors, and a memory; and
    one or more programs stored in the memory and executed by the one or more processors, wherein the programs comprise instructions for performing a data processing method comprising:
    obtaining rotation angular velocities and accelerations of the camera cyclically;
    obtaining a plurality of feature point pairs in two frames of images acquired by the camera, and obtaining pixel coordinate values of feature points in the feature point pairs, wherein each of the feature point pairs comprises two feature points that correspond to a same feature of a same object and that are respectively in the two frames of images;
    constructing epipolar constrict equations and calculating to-be-selected rotation matrices and to-be-selected displacement matrices according to pixel coordinate values and the epipolar constraint equations;
    obtaining a reference rotation matrix of the camera according to the rotation angular velocities of the camera, and obtaining a reference displacement matrix of the camera according to the accelerations of the camera; and
    filtering the to-be-selected rotation matrices and the to-be-selected displacement matrices according to the reference rotation matrix of the camera and the reference displacement matrix of the camera;
    wherein the filtering the to-be-selected rotation matrices and the to-be-selected displacement matrices according to the reference rotation matrix and the reference displacement matrix comprises:

obtaining a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices;

obtaining rotation vector angles between the reference rotation vector and the to-be-selected rotation vectors, and obtaining displacement vector angles between the reference displacement vector and the to-be-selected displacement vectors; and filtering the to-be-selected rotation matrices and the to-be-selected displacement matrices according to the rotation vector angles and the displacement vector angles; and wherein the to-be-selected rotation vectors comprise a first rotation vector and a second rotation vector, the to-be-selected displacement vectors comprise a first displacement vector and a second displacement vector, and the filtering the to-be-selected rotation matrices and the to-be-selected displacement matrices according to the rotation vector angles and the displacement vector angles comprises:

obtaining a first rotation vector angle between the reference rotation vector and the first rotation vector, obtaining a second rotation vector angle between the reference rotation vector and the second rotation vector, obtaining a first displacement vector angle between the reference displacement vector and the first displacement vector, and obtaining a second displacement vector angle between the reference displacement vector and the second displacement vector;

selecting a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and using the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix.

3. A non-transitory computer-readable storage medium comprising a computer program, the computer program, when executed by one or more processors, implementing a non-transitory computer-readable storage medium comprising:

obtaining rotation angular velocities and accelerations of a camera cyclically;

obtaining a plurality of feature point pairs in two frames of images acquired by the camera, and obtaining pixel coordinate values of feature points in the feature point pairs, wherein each of the feature point pairs comprises two feature points that correspond to a same feature of a same object and that are respectively in the two frames of images;

constructing epipolar constrict equations and calculating to-be-selected rotation matrices and to-be-selected displacement matrices according to pixel coordinate values and the epipolar constraint equations;

obtaining a reference rotation matrix of the camera according to the rotation angular velocities of the camera, and obtaining a reference displacement matrix of the camera according to the accelerations of the camera; and filtering the to-be-selected rotation matrices and the to-be-selected displacement matrices according to the reference rotation matrix of the camera and the reference displacement matrix;

wherein the filtering the to-be-selected rotation matrices and the to-be-selected displacement matrices according to the reference rotation matrix and the reference displacement matrix comprises:

obtaining a reference rotation vector of the reference rotation matrix, a reference displacement vector of the reference displacement matrix, to-be-selected rotation vectors of the to-be-selected rotation matrices, and to-be-selected displacement vectors of the to-be-selected displacement matrices;

obtaining rotation vector angles between the reference rotation vector and the to-be-selected rotation vectors, and obtaining displacement vector angles between the reference displacement vector and the to-be-selected displacement vectors; and filtering the to-be-selected rotation matrices and the to-be-selected displacement matrices according to the rotation vector angles and the displacement vector angles; and wherein the to-be-selected rotation vectors comprise a first rotation vector and a second rotation vector, the to-be-selected displacement vectors comprise a first displacement vector and a second displacement vector, and the filtering the to-be-selected rotation matrices and the to-be-selected displacement matrices according to the rotation vector angles and the displacement vector angles comprises:

obtaining a first rotation vector angle between the reference rotation vector and the first rotation vector, obtaining a second rotation vector angle between the is reference rotation vector and the second rotation vector, obtaining a first displacement vector angle between the reference displacement vector and the first displacement vector, and obtaining a second displacement vector angle between the reference displacement vector and the second displacement vector;

selecting a to-be-retained one from the first rotation vector and the second rotation vector and a to-be-retained one from the first displacement vector and the second displacement vector according to the first rotation vector angle, the second rotation vector angle, the first displacement vector angle, and the second displacement vector angle; and using the to-be-selected rotation matrix corresponding to the retained first rotation vector or the to-be-selected rotation matrix corresponding to the retained second rotation vector as a localization rotation matrix and the to-be-selected displacement matrix corresponding to the retained first displacement vector or the to-be-selected displacement matrix corresponding to the retained second displacement vector as a localization displacement matrix.

* * * * *